United States Patent [19]
Cooley

[11] 3,849,739
[45] Nov. 19, 1974

[54] LASER GLASS HOST COMPOSITIONS COMPRISING TeO$_2$, PbO AND ZnO

[75] Inventor: Richard F. Cooley, Toledo, Ohio

[73] Assignee: Owens-Illinois, Inc., Toledo, Ohio

[22] Filed: June 27, 1973

[21] Appl. No.: 374,261

[52] U.S. Cl.... 331/94.5 E, 252/301.4 R, 252/301.6 R, 106/47 Q
[51] Int. Cl.......... H01s 3/00, C03c 3/12, C03c 3/30
[58] Field of Search.................... 106/47 Q, 47 R; 331/94.5 E; 252/301.4 R, 301.4 F, 301.6 R

[56] References Cited
UNITED STATES PATENTS
3,423,326   1/1969   Redman .................... 252/301.6 R FOREIGN PATENTS OR APPLICATIONS
736,073   8/1955   Great Britain .................... 106/47 Q
741,986   12/1955   Great Britain .................... 106/47 Q
1,496,561   9/1972   Germany .......................... 106/47 Q OTHER PUBLICATIONS
Stanworth, "Tellurite Glasses," J. Soc. Glass Tech., Vol. 36, (1952), pp. 217–241, TP 845 5678.

*Primary Examiner*—Winston A. Douglas
*Assistant Examiner*—Mark Bell
*Attorney, Agent, or Firm*—Richard D. Heberling; E. J. Holler

[57] ABSTRACT

Laser glass host compositions for effective lasing amounts of Nd$_2$O$_3$ are disclosed, the host compositions comprising TeO$_2$, PbO and ZnO in certain molar amounts. Methods of making highly efficient laser articles, including laser rods, also are disclosed. The new use of the above-described TeO$_2$/PbO/ZnO glass compositions for forming laser articles are disclosed, the new use including forming laser articles from the glasses; pumping the laser articles to provide an energy inversion; and lasing the pumped articles.

8 Claims, 1 Drawing Figure

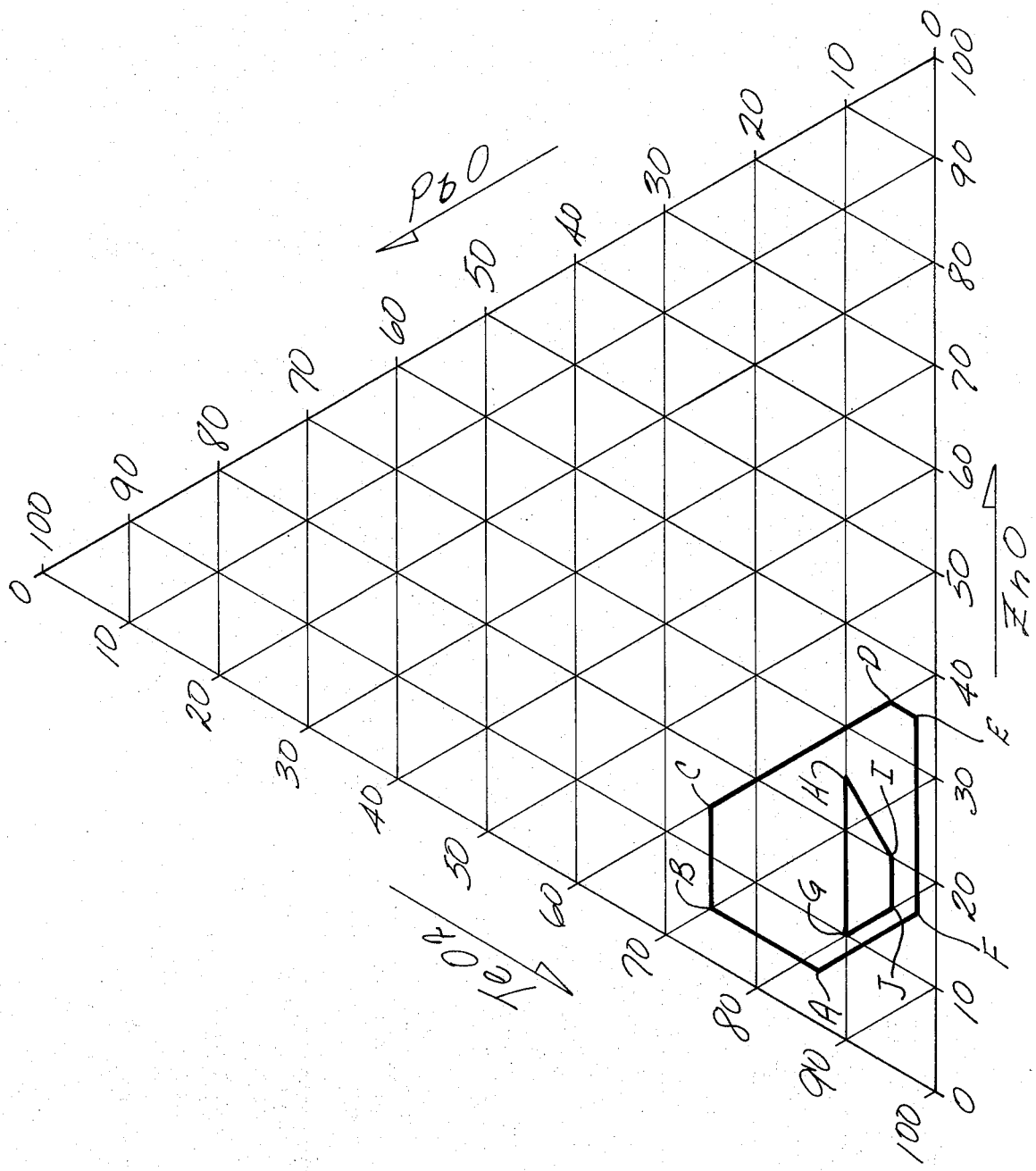

LASER GLASS HOST COMPOSITIONS COMPRISING TeO2, PbO AND ZnO

INVENTION

The present invention relates to glass host compositions for efficient laser articles, the host compositions comprising $TeO_2$, PbO and ZnO in certain molar amounts and containing effective lasing amounts of $Nd_2O_3$. The present invention also relates to methods of making laser articles with increased efficiency, the methods including melting laser glass batch-forming materials to provide a molten $TeO_2/PbO/ZnO$ glass containing an effective lasing amount of $Nd_2O_3$; forming a glass laser blank from the molten glass; and fabricating the glass laser article from the blank.

The present invention also relates to the new use for $TeO_2/PbO/ZnO$ glass compositions for lasing articles, the new use including forming the laser articles from the glass compositions that also contain an effective lasing amount of $Nd_2O_3$; pumping the laser article; and lasing the pumped article.

It is desirable to provide laser glass compositions that can be used to make outstanding, highly efficient glass laser articles. Also it is desirable to provide novel methods for making same and to provide the new use for glass compositions comprising $TeO_2$, PbO and ZnO in which the new use includes the steps of:

1. forming a glass laser article from the glass composition that is a host for an effective lasing amount of $Nd_2O_3$;
2. pumping the laser article; and thereafter
3. lasing the pumped article.

It is an object of the present invention to provide a laser glass composition containing $TeO_2$, PbO and ZnO in which the molar proportions thereof are defined in a general range by the area within the heavy lines connecting the points ABCDEF of the ternary diagram of the FIGURE of the drawings, the glass composition being a host for an effective lasing amount of $Nd_2O_3$.

It is an object of the present invention to provide a method for making a glass article, such as a laser rod, in which the method comprises the steps of:

1. melting laser glass batch-forming materials to provide a molten glass comprising $TeO_2$, PbO and ZnO, in which the molar proportions thereof are defined in a general range by the area within the heavy lines connecting points ABCDEF of the ternary diagram of the FIGURE, the molten glass being a host for an effective lasing amount of $Nd_2O_3$;
2. forming a glass laser blank from the molten glass; and
3. fabricating the laser article from the blank to provide a very efficient laser article.

It is an object of the present invention to provide the new use for a glass composition as a glass laser article in which the glass contains certain molar proportions of $TeO_2$, PbO and ZnO that are defined by the area within the heavy lines connecting points ABCDEF of the ternary diagram, and in which the glass composition is a host for an effective lasing amount of $Nd_2O_3$, the new use comprising the steps of:

1. forming a glass laser article from the glass composition comprising $TeO_2$, PbO and ZnO;
2. pumping the laser article to provide an energy inversion; and
3. lasing the pumped laser article.

It is an object of the present invention to provide highly efficient glass laser articles, such as rods and discs, made from a glass composition comprising certain molar amounts of $TeO_2$, PbO and ZnO, the composition being a host for an effective lasing amount of $Nd_2O_3$.

These and other objects will become apparent from the specification that follows, the appended claims, and the drawings, in which the FIGURE is a ternary diagram of the glass host composition of the present invention, in which the molar proportions of $TeO_2$, PbO and ZnO are set forth in a general range and in a preferred range by the heavy lines connecting the points ABCDEF and the points GHIJ, respectively, of the ternary diagram.

The present invention provides outstanding laser glass host compositions for effective lasing amounts of $Nd_2O_3$, the host compositions comprising $TeO_2$, PbO and ZnO in certain molar proportions thereof that are defined in a general range by the area within the heavy lines connecting the points ABCDEF of the ternary diagram of the FIGURE of the drawings.

Preferably, the molar proportions of $TeO_2$, PbO and ZnO are defined by the area within the heavy lines connecting the points GHIJ of the ternary diagram.

The present invention also provides methods for making highly efficient glass laser articles, the methods including the steps of:

1. melting laser glass batch-forming materials to provide a molten glass comprising $TeO_2$, PbO and ZnO in which the molar proportions thereof are defined in a general range by the area within the heavy lines connecting the points ABCDEF of the ternary diagram, the molten glass capable of acting as a host for an effective lasing amount of $Nd_2O_3$;
2. forming a glass laser blank from the molten glass; and
3. fabricating the outstanding laser articles from the glass laser blank.

The present invention also provides the new use for a glass composition as a glass laser article in which the glass comprises $TeO_2$, PbO and ZnO in certain molar proportions that are defined in a general range within the area formed by the lines connecting the points ABCDEF in the ternary diagram, and in which the glass composition is a host for an effective lasing amount of $Nd_2O_3$, the new use comprising the steps of:

1. forming a glass laser article from the glass composition comprising $TeO_2$, PbO and ZnO;
2. pumping the laser article to provide an energy inversion; and
3. passing monochromatic light through the article to provide a stimulated emission at a wavelength of about 1.06 microns.

A zinc tellurite glass consisting essentially of a major molar proportion of $TeO_2$ and between about 20–40 molar percent of ZnO is described and claimed in the Redman U.S. Pat. No. 3,423,326. These zinc tellurite glasses were reported as having some fluorescent activity when doped with Nd2O3.

As previously indicated, the outstanding laser glass host compositions of the present invention exhibit much higher fluorescent activity than the zinc tellurite glasses of the Redman patent, the increased fluorescent activity indicating a greater lasing efficiency for lasing articles made from the host compositions of the present invention. As previously described, only certain molar proportions of $TeO_2$, PbO and ZnO can be used to provide the highly efficient lasing articles, such as rods and discs. The increase in fluorescent activity of the glasses of the present invention, when compared to the working examples of the Redman patent, is generally at least about 50 percent and preferably at least about 60 or 70 percent. Often, the increase is at least about 50 percent for the glass laser articles of the present invention when compared to the working examples of U.S. Pat. No. 3,423,326. There is no mention of any glass system other than that of a host composition consisting of tellurium oxide and zinc oxide in the Redman patent. There is no suggestion in the Redman patent that highly efficient laser articles can be made from a host composition containing only certain molar proportions of $TeO_2$, PbO and ZnO.

In general, the laser glass host compositions of the present invention contain about 60–82 mole percent $TeO_2$, about 5–35 mole percent ZnO, and about 2–25 mole percent PbO.

Preferably, the laser glass host compositions of the present invention comprise about 65–80 mole percent $TeO_2$, about 5–10 mole percent PbO, and about 10–25 mole percent ZnO. The above-described general ranges and preferred ranges of $TeO_2$, PbO and ZnO in the host compositions are doped with an effective lasing amount of $Nd_2O_3$, the general range of $Nd_2O_3$ being about 0.01–1.5 mole percent, the preferred range of $Nd_2O_3$ being about 0.3–1.0 mole percent, and the optimum range of $Nd_2O_3$ being about 0.4–0.9 mole percent.

Good results have been obtained with glass host compositions in which the glass comprises about 65 mole percent $TeO_2$, about 10 mole percent PbO, and about 25 mole percent ZnO; or about 80 mole percent $TeO_2$, about 10 mole percent PbO and about 10 mole percent ZnO; or about 75 mole percent $TeO_2$, about 5 mole percent PbO, and about 20 mole percent ZnO.

In accordance with the present invention, as previously indicated, the increase in fluorescent activity for laser articles of the present invention, unexpectedly is at least about 50 percent over that of a zinc tellurite glass containing 65 mole percent $TeO_2$ and 35 mole percent ZnO.

The increase in fluorescent activity surprisingly is at least about 50 percent greater than that of a lithia-calcia-alumino silicate laser glass as set forth in U.S. Pat. No. 3,471,409, to Lee and Rapp, the laser composition containing the following ingredients in approximate mole percentages:

| Ingredient | Mole Percent |
| --- | --- |
| $SiO_2$ | 60 |
| $Al_2O_3$ | 2.5 |
| $Li_2O$ | 27.5 |
| CaO | 10 |
| $Nd_2O_3$ | 0.5 |

The highest fluorescent activity value for a zinc tellurite glass containing 65 mole percent $TeO_2$ and 35 mole percent ZnO is about 2.09 when compared to the fluorescent intensity value of the above-described lithia-calcia-alumino silicate glass laser, which is the reference glass, arbitrarily designated or held to be 1.0.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent | | Weight Percent | |
| --- | --- | --- | --- | --- |
| | Host Glass | Laser Article | Host Glass | Laser Article |
| $TeO_2$ | 63.0 | 63.0 | 73.5 | 72.3 |
| ZnO | 32.0 | 31.6 | 18.7 | 18.5 |
| PbO | 5.0 | 4.7 | 7.7 | 7.5 |
| $Nd_2O_3$ | — | 0.7 | — | 1.7 |

The slurry was mixed for 10 minutes and poured into a gold crucible. The crucible was placed in an air circulating oven with the temperature maintained at 110°C. overnight to remove the water. The crucible was then placed in an electric resistance furnace with the temperature at 750°C. for 3 hours, or until homogenous, after which the molten glass immediately poured into a preheated (260°C.) graphite mold forming a disc having an 11/16 inch diameter and ¼ inch thickness. The graphite mold was placed in an annealing oven maintained at 340°C. After 1 hour, at 340°C., the temperature of the annealing oven was lowered at a rate of 38°C. per hour to 250°C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.08.

PART B

The polished glass disc from Part A was tested for fluorescence intensity and decay time in a high power pulsed test system. The disc was placed in a holder and exposed to a beam of light from an EG & G model FX 12–25 xenon flash lamp. The flash lamp had a flash duration of about 20 microseconds. The disc was not observed to solarize after repeated excitation by the flash lamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S-1 photomultiplier, having a narrow band pass filter.

The fluorescence intensity measurement was normalized against ED-2, a glass laser composition of Owens-Illinois, Inc., comprising, in mole percent, 60.0% $SiO_2$, 2.5% $Al_2O_3$, 27.5% $Li_2O$, 10% CaO, 0.16% $CeO_2$ and 0.5% $Nd_2O_3$, disclosed in U.S. Pat. No. 3,471,409, as Example 1. The fluorescence intensity was found to be 3.09 when normalized against the glass laser composition; 3.09 times the intensity of the glass laser composition.

The fluorescence intensity was corrected for the refractive indices of the glass disc and the reference glass laser composition by $$FI \text{ (corrected)} = FI \text{ (normalized)} [(1.56)^2/(\eta \text{ glass disc})^2]$$

The corrected fluorescence intensity was 1.69. The fluorescence decay time was 154 microseconds.

EXAMPLE 2

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| TeO$_2$ | 65.0 | 64.5 | 70.8 | 69.8 |
| ZnO | 25.0 | 24.8 | 13.9 | 13.6 |
| PbO | 10.0 | 9.9 | 1.5 | 14.9 |
| Nd$_2$O$_3$ | — | 0.7 | — | 1.6 |

The refractive index of the finished polished glass disc was measured to be 2.12.

PART B

The polished glass disc from Part A was tested for fluorescence intensity and decay time as described in Part B of Example 1. The normalized fluorescence intensity was 3.1 and the corrected fluorescence intensity was 1.68. The fluorescence decay time was 145 microseconds.

EXAMPLE 3

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| TeO$_2$ | 80.0 | 79.5 | 80.8 | 79.5 |
| ZnO | 10.0 | 9.9 | 5.1 | 5.0 |
| PbO | 10.0 | 9.9 | 14.1 | 13.8 |
| Nd$_2$O$_3$ | — | 0.7 | — | 1.6 |

The refractive index of the finished polished glass disc was measured to be 2.21.

PART B

The polished glass disc from Part A was tested for fluorescence intensity and decay time as described in Part B of Example 1. The normalized fluorescence intensity was 3.8 and the corrected fluorescence intensity was 1.84. The fluorescence decay time was 135 microseconds.

EXAMPLE 4

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| TeO$_2$ | 75.0 | 74.5 | 77.7 | 76.4 |
| ZnO | 15.0 | 14.8 | 7.9 | 7.7 |
| PbO | 10.0 | 9.9 | 14.4 | 14.2 |
| Nd$_2$O$_3$ | — | 0.7 | — | 1.6 |

The refractive index of the finished polished glass disc was measured to be 2.16.

PART B

The polished glass disc from Part A was tested for fluorescence intensity and decay time as described in Part B of Example 1. The normalized fluorescence intensity was 3.3 and the corrected fluorescence intensity was 1.74. The fluorescence decay time was 140 microseconds.

Other specific glass laser compositions set forth herein as being suitable for use in the present invention can be substituted for the specific glass laser compositions used in the working examples to provide substantially equivalent results. For instance, any of the compositions set forth wherein the area formed by the heavy lines connecting the points ABCDEF, of the ternary diagram, can be used in place of the specific laser compositions used in the working examples (such as the host glass of Example 1 that comprises 63 mole percent TeO$_2$, 5 mole percent PbO and 32 mole percent ZnO) to provide an increased efficiency of at least about 50 percent over that of the zinc tellurite glasses of the Redman patent, as previously described. Often, the increase in efficiency is as high as about 60 to 70 percent or more for the glass compositions of the present invention, including those in the preferred range within the area formed by the heavy lines connecting points GHIJ of the ternary diagram.

What is claimed is:

1. A laser glass host composition comprising TeO$_2$, PbO and ZnO in which the proportions in molar amounts of $TeO_2$, PbO and ZnO are defined by the area within the heavy lines connecting the points ABCDEF of the ternary diagram of the Figure of the drawings, the laser glass host composition being a host for an effective lasing amount of $Nd_2O_3$.

2. A laser glass host composition as defined in claim 1 in which the proportions of $TeO_2$, PbO and ZnO in molar amounts are defined by the heavy lines connecting the points GHIJ of the ternary diagram of the Figure of the drawings.

3. A laser glass composition comprising:
1. a glass host containing about 60–82 mole percent $TeO_2$, about 2–25 mole percent PbO, and about 5–35 mole percent ZnO; and
2. an effective lasing amount of $Nd_2O_3$.

4. A laser glass composition comprising about 65–80 mole percent $TeO_2$, about 5–10 mole percent PbO and about 10–25 mole percent ZnO, and about 0.01–1.5 mole percent $Nd_2O_3$.

5. A laser glass composition as defined in claim 3 in which the glass comprises about 65 mole percent $TeO_2$, about 10 mole percent PbO and about 25 mole percent ZnO.

6. A laser glass composition as defined in claim 3 in which the host comprises about 80 mole percent $TeO_2$, about 10 mole percent PbO and about 10 mole percent ZnO.

7. A laser glass composition as defined in claim 3, the host comprising about 75 mole percent $TeO_2$, about 5 mole percent PbO and about 20 mole percent ZnO.

8. The new use for a glass composition as a glass laser article in which the glass comprises $TeO_2$, PbO and ZnO, the molar portion thereof being defined by the area within the heavy lines connecting the points ABCDEF in the ternary diagram in the FIGURE of the drawings, and which glass composition is a host for an effective lasing amount of $Nd_2O_3$, the new use comprising the steps of:

1. forming the glass laser articles;
2. pumping the laser article to provide an energy inversion; and
3. lasing the pumped article.

* * * * *